United States Patent
Wu et al.

(10) Patent No.: US 6,765,924 B1
(45) Date of Patent: Jul. 20, 2004

(54) NETWORKING METHOD AND APPARATUS USING SILENT SLOTS TO FACILITATE TRANSMISSION COLLISION DETECTION

(75) Inventors: Qiang Wu, Portland, OR (US); Philip W. Martin, Banks, OR (US); Gregory A. Peek, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/378,555

(22) Filed: Aug. 19, 1999

(51) Int. Cl.[7] .................. H04L 12/413; H04L 12/43; H04J 3/12; G06F 13/372
(52) U.S. Cl. .................. 370/447; 370/461; 370/528; 710/124
(58) Field of Search .................. 370/431, 445, 370/446, 447, 448, 229, 461, 458, 459, 528; 710/107, 124, 242

(56) References Cited

U.S. PATENT DOCUMENTS

| | | | | | |
|---|---|---|---|---|---|
| 4,847,835 A | * | 7/1989 | Le Lann et al. | ......... | 340/825.5 |
| 5,387,769 A | * | 2/1995 | Kupersmith et al. | ........ | 187/248 |
| 5,963,539 A | * | 10/1999 | Webber et al. | ............... | 370/213 |
| 6,169,744 B1 | * | 1/2001 | Grabelsky et al. | .......... | 370/229 |
| 6,353,618 B1 | * | 3/2002 | Hung et al. | .................. | 349/138 |

* cited by examiner

Primary Examiner—Hassan Kizou
Assistant Examiner—Timothy Lee
(74) Attorney, Agent, or Firm—Blakely, Sokoloff, Taylor & Zafman LLP

(57) ABSTRACT

A networking method is disclosed. At least one silent slot is included in either a collision detection prefix disposed before a preamble of one or more frames of data to be transmitted across a media or in the one or more frames of data to be transmitted across the media. Transmission collision is detected during the at least one silent slot included. In one embodiment, the method is embodied in a network interface controller having a media access control block to control access to a media, and a physical signal block to physically signal data to be transmitted. The media access controller includes the at least one silent slot in either the collision detection prefix or in the data, and the physical signaling block performs the transmission collision detection during the included at least one silent slot.

18 Claims, 4 Drawing Sheets

NETWORKING METHOD AND APPARATUS USING SILENT SLOTS TO FACILITATE TRANSMISSION COLLISION DETECTION

BACKGROUND OF THE INVENTION

1. Field of the Invention

The present invention relates to the field of networking. More specifically, the present invention relates to approaches for addressing the issue of transmission collision in a shared media of a harsh networking environment.

2. Background Information

Recent advances in microprocessor and communication technology have led to an increasing number of computers and other digital devices (such as, printers, scanners and so forth) being networked together. Computers or digital devices of close proximity to one another are networked together locally through a local area network (LAN), which in turn are networked with other locally networked remote computers/digital devices by internetworking the LANs via wide area networks (WAN). However, the popularity and success in networking computers and other digital devices together are still substantially confined to the work place, where the networking environment is typically a well controlled environment (in terms of control attenuation, delay, echo and so forth). Networking computers and peripherals together in the home remains a challenge, as economics dictate that the networking be accomplished in a less controlled environment, using existing power, lines or phone lines, as called for by industry initiatives such as the Consumer Electronics Bus (CEBus®) promoted by the Electronic Industry Association (EIA-600) and Anypoint™ Home Networking available from Intel Corporation of Santa Clara, Calif.

Similar to all shared media networks, one of the issues that needs to be addressed is the problem of transmission collision, i.e. more than one transmitter accessing the media at substantially the same time. One way to address the issue is to avoid it through ownership arbitration. While the approach is employed by many bus systems, such as the Universal Serial Bus or the Peripheral Control Interconnect Bus, ownership arbitration have generally been considered to be too inefficient for local area networking. Furthermore, if ownership is determined through token passing, as practiced in token ring networks, the token may be lost in a harsh networking environment. Another way to address the issue is to accept it by employing an acknowledgement scheme. That is, a transmitter will re-transmit the data unless an acknowledgement is received from the intended recipient. The acknowledgement approach is probably the most popular approach employed in the home and other harsh networking environments. However, the approach is relatively inefficient, as the transmitter has to wait for the acknowledgment to complete a transmission. The data may have actually been received by the intended recipient, and it is only the acknowledgment that ran into collision.

The carrier sense multiple access with collision detection (CSMA/CD) is probably the most popular approach for implicitly arbitrating and controlling access to a shared media. However, CSMA/CD tends to work well only in well defined and tightly controlled networking environment, such as the popular Ethernet network, as defined by the ISO/IEC 8802-3 standard (which adopted the ANSI/IEEE Standard 802.3). In home networking, and other less controlled harsh networking environment, because of noise and other environmental problems, it is difficult to distinguish the noise or echo phenomenon from another transmission source.

Accordingly, a more efficient networking approach for harsh networking environment, such as home networking, is desired.

SUMMARY OF THE INVENTION

A novel networking method is disclosed. Under the novel networking method, at least one silent slot is included in either a collision detection prefix (CDP) disposed before a preamble of one or more frames of data, or in the one or more frames data, to be transmitted across a media. Transmission collision is detected during the at least one silent slot included.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as receivers, transmitters and so forth. Also, parts of the description will also be presented in terms of operations performed through the execution of programming instructions, using terms such as determining, and so on. As well understood by those skilled in the art, these operations are often accomplished through storing, transferring, combining, or otherwise manipulating electrical, magnetic, and/or optical signals.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
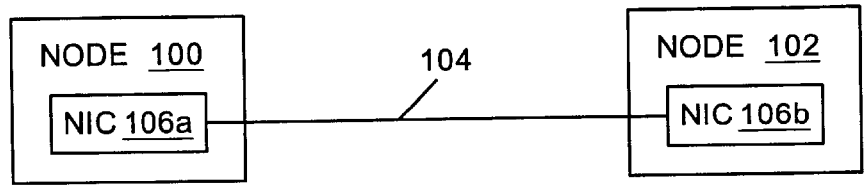
FIG. 1 illustrates an overview of the present invention.

Referring now to FIG. 1, wherein an overview of the present invention is shown. As illustrated, node 100 and node 102 are communicatively coupled to each via media 104. Each of nodes 100 and 102 includes network interface controller 106a and 106b respectively, both incorporated with the teachings of the present invention, coupling nodes 100 and 102 to media 104. More specifically, in accordance with the present invention, each of network interface controllers 106a and 106b employs one or more silent slots to facilitate transmission collision detection. Furthermore, each of network interface controllers 106a and 106b employs different locations for the silent slots. As a result, media 104 may be of a type that is not well controlled in terms of control attenuation, echo, and so forth, i.e. a harsh networking environment, such as home networking. However, it should be noted that while the present invention is designed to be well suited for operation in a harsh networking environment, the present invention may also be practiced in a well controlled networking environment. Additionally, it should also be noted that the silent slot concept of the present invention is different from the prior art concept of inter-frame gap, which is used to differentiates data frames.

Nodes 100 and 102 are intended to represent a broad range of digital devices known in the art, including but not limited to computers, printers, scanners, hubs, routers, bridges, switches, and so forth. Similarly, media 104 may be anyone of a number of wire media known in the art, including but not limited to power lines and phone lines (as in the case of home networking). Alternatively, media 104 may be a wireless media, such as radio frequency (RF) or infared (IR). As will be also readily apparent from the description to follow, network interface controller 106a/106b may be implemented in any one of a number of known form factors, including but not limited to the form factor of an add-on card, a PC card, or integrally disposed in a motherboard or a baseboard.

Furthermore, while only two nodes and one shared media are shown in FIG. 1, as will be readily apparent from the description to follow, the present invention may be practiced with any number of nodes and any number of shared media.

Figure 2A:
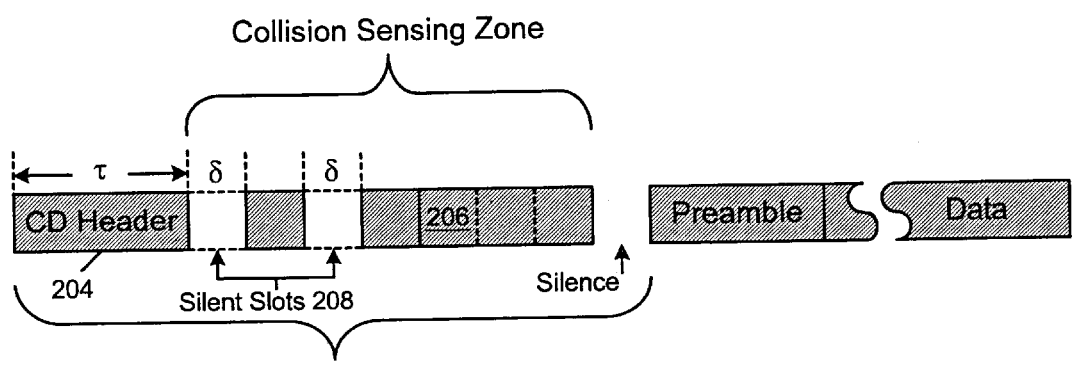
FIGS. 2a–2b illustrate placement of the silent slots in accordance with two embodiments.
Figure 2B:
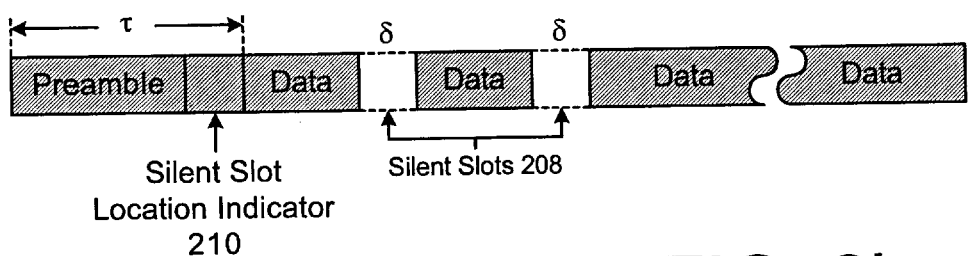

FIGS. 2a–2b illustrate the concept of silent slots of the present invention in accordance with two embodiments. In the embodiment of FIG. 2a, network interface controller (NIC) 106a/106b adds collision detect prefix (CDP) 202 to each packet to be transmitted over media 104. For the illustrated embodiment, CDP 202 includes header 204, a number of non-silent slots 206 and a number of silent slots 208. Header 204 is used to provide the "set up" time necessary for performing collision detection. The size of header 204 is proportional to the time required for a signal to propagate between two farthest nodes on a shared media. Accordingly, it is pre-determined. In one embodiment, the size of header 204 is twice of the above mentioned time required. Non-silent slots 206 and silent slots 208 together make up the sensing zone for collision detection. Silent slots 208 are provided to facilitate collision detection. Any number of silent slots 208 may be employed, and they may be placed anywhere in the collision detection period, as long as they are not in the same locations as other transmitters. For the illustrated embodiment, two silent slots 208 are employed, and they are placed in CDP 202 randomly. Silent slots are relocated if necessary to avoid conflicts between among the transmitters. In the illustrated example instance, the two silent slots 208 are placed in the first and third slot. The size of each silent slot 208 is larger than the settling time of the impulse response of a network. For the illustrated embodiment, the size is about 100% larger than the settling time. More specifically, the size of a silent slot is about 5 us.

In the embodiment of FIG. 2b, in lieu of CDP 202, network interface controller (NIC) 106a/106b inserts silent slots 208 into the body of the frames of data to be transmitted. (NIC) 106a/106b also adds the locations of the silent slots 210 in the conventional preamble of the data. Similarly, any number of silent slots 208 may be employed, and they may be inserted into any locations in the body of the data to be transmitted, as long as there are no conflicts among the locations employed by the different transmitters. For the illustrated embodiment, two silent slots 208 are employed, and they are also placed randomly in the data being transmitted. For the illustrated example instance, the two silent slots 208 are inserted intotwo arbitrary locations in the body of the data. As the embodiment of FIG. 2a, the size of each silent slot 208 is larger than the settling time of the impulse response of a network.

Figure 3:
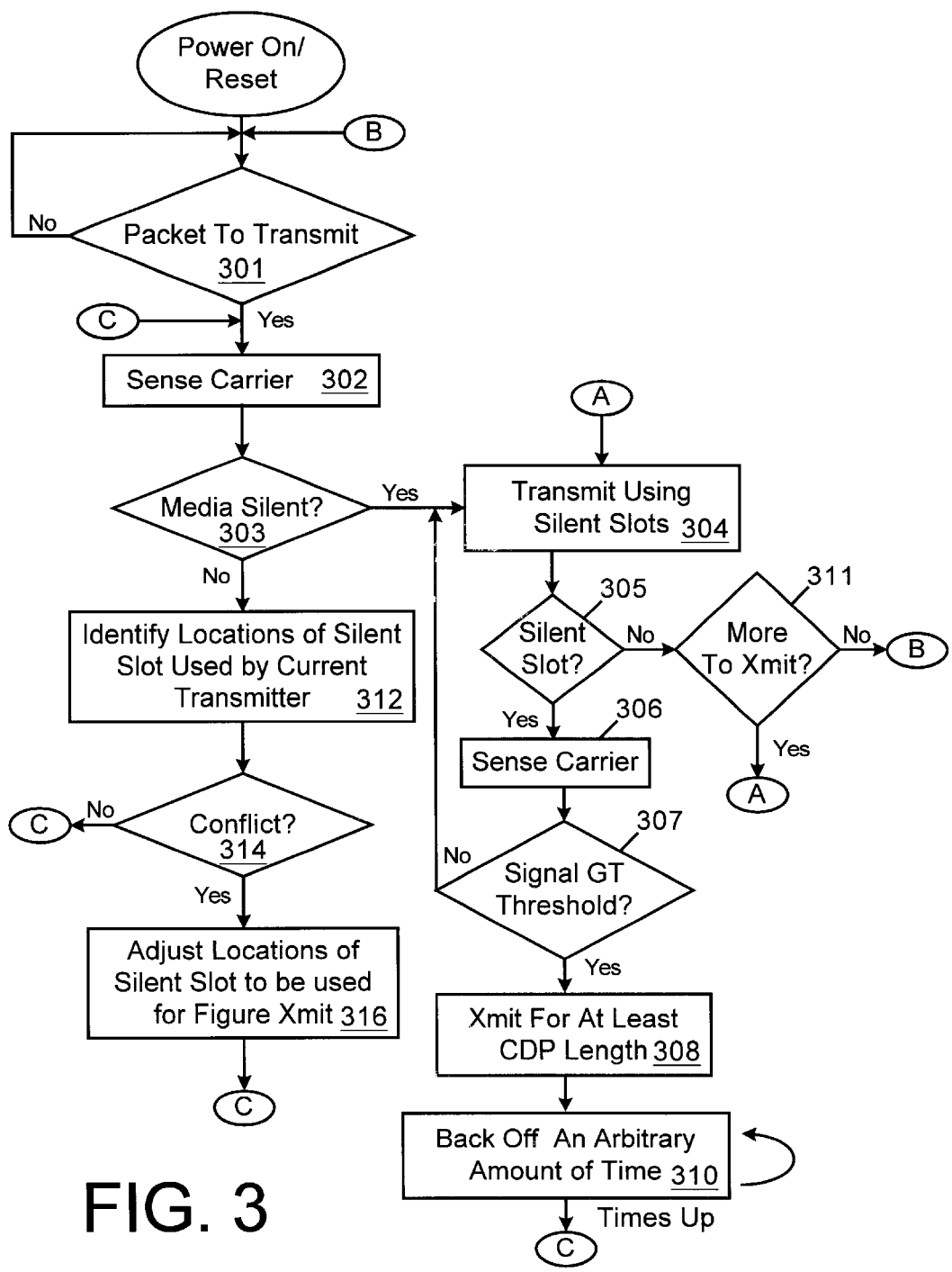
FIG. 3 illustrates the transmit operational flow of the network interface controller of FIG. 1 in accordance with one embodiment.

FIG. 3 illustrates the transmit operational flow of NIC 106a/106b in accordance with one embodiment. As illustrated, upon power on/reset, NIC 106a/106b awaits data for transmit, block 301. At transmit time, NIC 106a/106b senses the media to see if there is any signal on the media, block 302. If the media silent time is larger than a pre-defined inter-frame gap, block 303, NIC 106a/106b starts to transmit the data frames in accordance with one of the embodiments of FIG. 2a or 2b, block 304. During the period of the silent slots, block 305, NIC 106a/106b turns on its receiver to examine the signal strength on the media, block 306. If the signal strength is lower than a predetermined threshold (no collision detected), block 307, NIC 106a/106b returns to block 304 and continues transmission. However, if the signal strength is greater than a predetermined threshold (collision detected), NIC 106a/106b continues to transmit (in one embodiment, without anymore silent slots) for at least the duration of the collision detection period of FIG. 2a (even for the embodiment of FIG. 2b), block 308, then stops transmission, and backs off for an arbitrary amount of time, block 310. Upon backing off for the arbitrary amount of time, NIC 106a/106b restarts the process at block 302. Back at block 305, if it is not "silent slot time" and there are more data to transmit, NIC 106a/106b continues operation at block 302, otherwise, NIC 106a/106b returns to block 301 to await data for transmission.

Back at block 303, if the media silent time is not larger than a pre-defined inter-frame gap, NIC 106a/106b identifies the locations of the silent slots employed by the current transmitter, block 312, and determines if the locations are the same as those employed by NIC 106a/106b, block 314. If the location of the silent slots are the same, i.e. there is conflict, NIC 106a/106b modifies the locations of the silent slots it will employ, block 316, such that they do not conflict with the ones employed by other nodes sharing the media, in particular, the current transmitting node. If the location of the silent slots are not the same, no further actions are taken. The process continues at 302 where NIC 106a/106b re-checks if the media is quiet, implying availability for its use to transmit data.

Figure 4B:
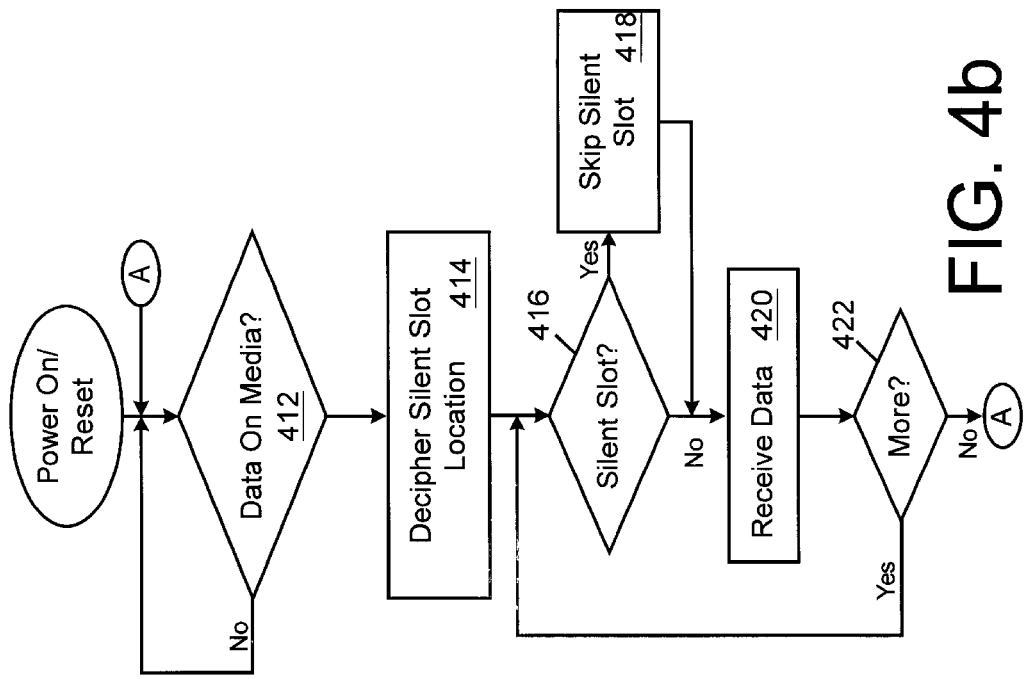
FIGS. 4a–4b illustrate the receive operational flow of the network interface controller of FIG. 1 in accordance with two embodiments.
Figure 4A:
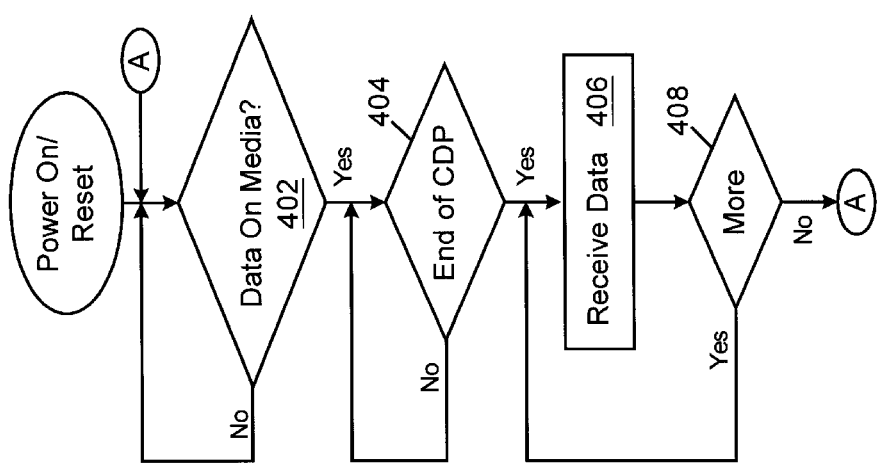

FIGS. 4a–4b illustrate the receive operational flow of NIC 106a/106b in accordance with two embodiments. For the embodiment of FIG. 4a, silent slots are employed in accordance with the embodiment of FIG. 2a, i.e. the silent slots are randomly placed in a collision detection prefix. For this embodiment, as illustrated, upon power on/reset, NIC 106a/106b awaits data to be present on the media, block 402. Upon detecting data for the media, NIC 106a/106b further awaits the elapse of the CDP period, block 404. Upon skipping the CDP period, NIC 106a/106b begins to receive data as in the prior art, block 406. The process continues, i.e. repeating block 406, until all data have been received, block 408. At such time, NIC 106a/106b returns to block 402 and awaits for data on the shared media again. Note that, as in the prior art, if the data received are not addressed to the host node of NIC 106a/106b, NIC 106a/106b discards the received data.

For the embodiment of FIG. 4b, silent slots are employed in accordance with the embodiment of FIG. 2b, that is the silent slots are randomly placed in the data frame without employment of a collision detection prefix. For this embodiment, as illustrated, upon power on/reset, NIC 106a/106b awaits data to be present on the media, block 412. Upon detecting data for the media, NIC 106a/106b deciphers the locations of the silent slots from the header, block 414. Next, NIC 106a/106b determines if it is in a silent slot, block 416. If it is not in a silent slot, NIC 106a/106b proceeds directly to block 420 and receives the data, otherwise, NIC 106a/106b awaits its elapse, i.e. skipping the silent slot, before proceeding to block 420 and receives the data. The process, i.e. block 416–420 are repeated until all data frames are received. At such time, NIC 106a/106b returns to block 412 and awaits for data on the shared media again. Similarly, as described earlier, if the data received are not addressed to the host node of NIC 106a/106b, NIC 106a/106b discards the received data.

As those skilled in the art would appreciate, the above transmit and receive operational flows may be implemented in firmware as well as via ASIC, including programmable logic, such as PAL, FPGA and the like. Rendering the present invention into practice in these manners in accordance with the teachings set forth above is well within the ability of those ordinarily skilled in the art of network interface controllers. Accordingly, except for the example implementations of FIG. 5a–5b, NIC 106a/106b will not be further described.

Figure 5A:
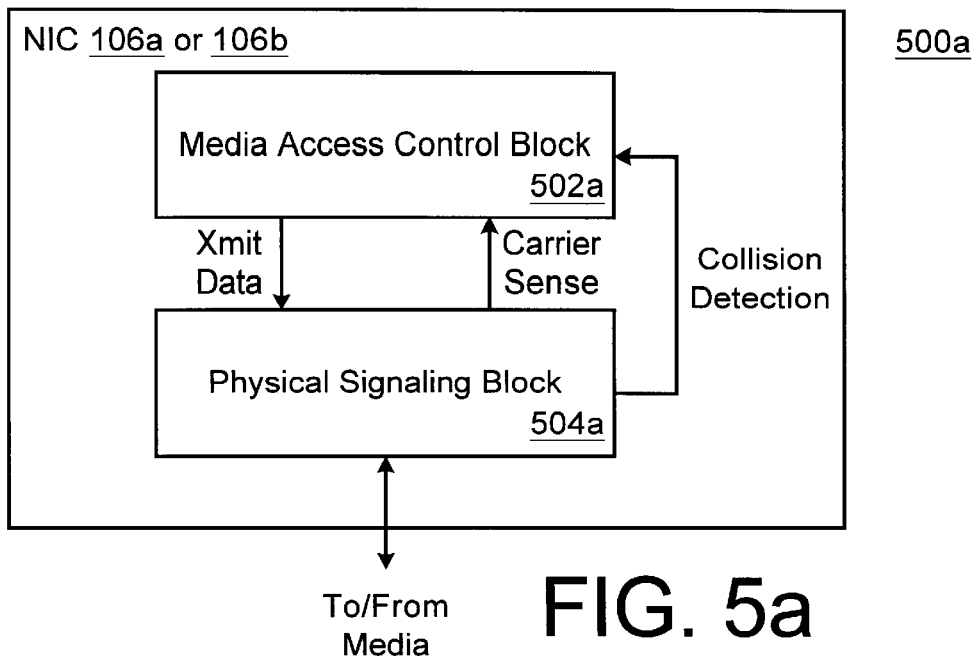
FIGS. 5a–5b illustrate two implementations of the network interface controller of FIG. 1 in accordance with two embodiments.
Figure 5B:
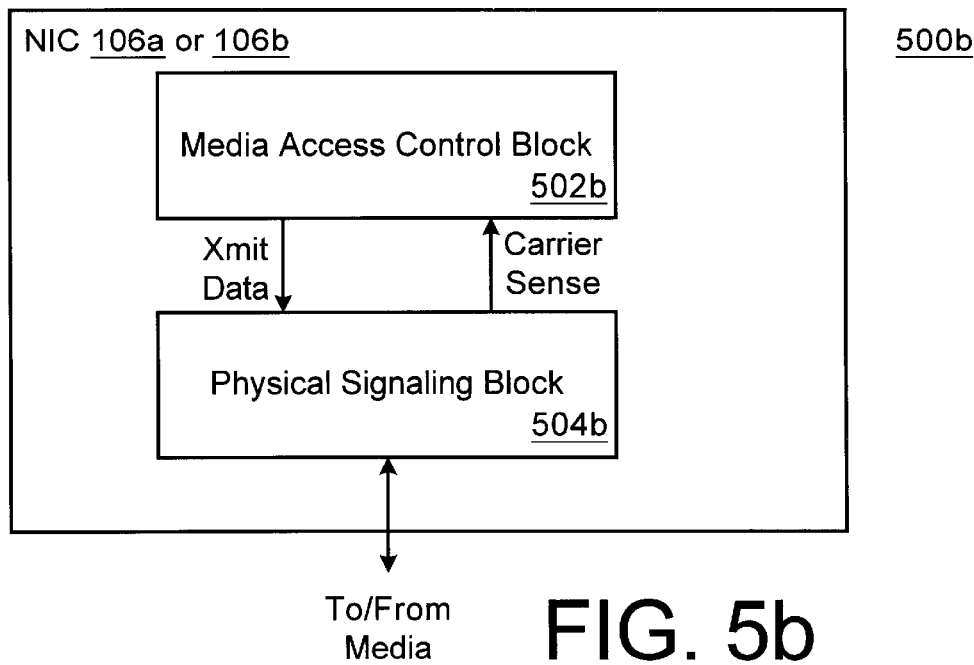

As alluded to earlier, FIGS. 5a–5b illustrate two implementations of NIC 106a/106b in accordance with two embodiments. In both embodiments, 500a and 500b, as in many prior art implementations, such as Ethernet network interface controllers, NIC 106a/106b comprises media access control block 502a/502b and physical signaling block 504a/504b coupled to each other as shown. Media access control block 502a/502b controls access to media 104 by NIC 106a/106b, whereas physical signaling block 504a/504b is responsible for the physical signaling on media 104. Physical signaling block 504a/504b also performs carrier sensing as in the prior art.

However, unlike the prior art, in both embodiments, media access control block 402a/402b implements the above described operations of inserting the silent slots into the transmit data, in accordance with one of the embodiments of FIG. 2a or 2b; and physical signaling block 504a/504b performs the above described operation of determining the locations of the silent slots of a current transmitter if carrier is sensed on the media prior to transmission, and the operation of determining signal strength on the media during the silent slots, while it is transmitting. In both embodiments, media access control block 502a/502b adjusts the locations it will employ to insert the silent slots, responsive to the determination of physical signaling block 504a/504b.

For the embodiment of FIG. 5a, physical signaling block 504a provides two separate signals to media access control block 502a, one denoting carrier sense prior to transmission and one denoting detection of collision during transmission. The detection of collision signal is provided when physical signaling block 504a detects that the signal strength on the media is greater than the predetermined threshold during a silent slot, while it is transmitting. In other words, for this embodiment, physical signaling block 504a directly makes the collision inference, and signals media access control block 502a accordingly. Thus, media access control block 502a does not have to make any inference with respect to collision detection.

For the embodiment of FIG. 5b, physical signaling block 504b provides a single signal to media access control block 502b denoting carrier sense prior to transmission as well as detection of excessive signal strength during a silent slot, while it is transmitting. Thus, under this embodiment, media access control block 502a is responsible for making the collision detection inference responsive to the carrier sense signal (as in prior art media access control block of Ethernet network interface controllers).

Thus, as can be readily seen from the above description, NIC 106a/106b may be easily formed by modifying existing Ethernet network interface controllers, in particular, the embodiment of FIG. 5b. As those skilled in the art will appreciate, this provides a significant advantage for current Ethernet network interface controller manufacturers to be able to rapidly enter and support harsh networking environment, such as home networking.

Conclusion

From the foregoing description, those skilled in the art will recognize that many other variations of the present invention are possible. Thus, the present invention is not limited by the details described, instead, the present invention can be practiced with modifications and alterations within the spirit and scope of the appended claims. Accordingly, a novel networking method and apparatus using silent slots to facilitate transmission collision detection has been described.

What is claimed is:

1. A method comprising:
   sensing media by a network interface controller to determine if there is a signal on the media and if not:
      starting to transmit data frames, wherein the data frames include silent slots interspersed between non-silent slots in random positions;
      examining a signal strength on the media during a period of silent slots; and
      continuing transmission of the data frames if the examined signal strength is lower than a predetermined threshold; and
   sensing media by a network interface controller to determine if there is a signal on the media and if so:
      identifying locations of silent slots used by a current transmitter; and
      determining if the locations of silent slots used by the current transmitter are the same as locations of silent slots used by another transmitter and if so, modifying the locations of the silent slots used by the current transmitter.

2. The networking method of claim 1, wherein the silent and non-silent slots are located in a collision detection prefix disposed before a preamble of one or more of the data frames.

3. The networking method of claim 1, wherein the silent and non-silent slots are located in one or more of the data frames.

4. The networking method of claim 1, further comprising selecting the random positions.

5. The networking method of claim 4, further comprising determining if another set of random positions needs to be selected.

6. A network interface controller comprising:

a signaling block to signal frames of data, to identify locations of silent slots used by a current transmitter, to determine if the locations of silent slots used by the current transmitter are the same as locations of silent slots used by another transmitter, and to detect for transmission collision during at least one of the silent slots; and a media access cool block coupled to the signaling block to control access to media and to modify the locations of the silent slots used by the current transmitter if the locations of silent slots used by the current transmitter are determined by the signaling block to be the same as the locations of silent slots used by another transmitter.

7. The network interface controller of claim 6, wherein the media access control block to control access to media to which the network interface controller is coupled, the media access control block to include a plurality of silent slots either in one or more frames of data to be transmitted, or in a collision detection prefix disposed before a preamble of the one or more frames of data to be transmitted.

8. The network interface controller of claim 7, wherein the plurality of silent slots are in random positions.

9. The network interface controller of claim 8, wherein the media access control block further selects the random positions.

10. The network interface controller of claim 9, wherein said media access control block further determines if another set of random positions needs to be selected.

11. An apparatus comprising:

a processor; and a networking interface to couple the processor to a media to network with another digital apparatus, wherein the networking interface to identify locations of silent slots used by a current transmitter, to determine if the locations of silent slots used by the current transmitter are the same as locations of silent slots used by another transmitter, to modify the locations of the silent slots used by the current transfer if the locations of silent slots used by the current transmitter are determined to be the same as locations of silent slots used by another transmitter, and to detect for transmission collision during at least one of the silent slots.

12. The apparats of claim 11, wherein the networking interface to include the silent slots in either a collision detection prefix disposed before a preamble of one or more frames of data to be transmitted or in the one or more frames of data to be transmitted across the media.

13. The apparatus of claim 12, wherein the networking interface includes a physical signaling block to physically signal the one or more frames of data, including the collision detection prefix, if any, to transmit the one or more frames of data across the media, wherein the physical signaling block includes circuitry to detect transmission collision during at least one of the silent slots and to determine if the locations of silent slots used by the current transmitter are the same as locations of silent slots used by another transmitter.

14. The apparatus of claim 11, wherein said networking interface includes a media access control block to control access to the media, wherein the media access control block includes circuitry to perform inclusion of the silent slots and to perform modification of the locations of the silent slots used by the current transmitter.

15. The apparatus of claim 14, wherein the silent slots are in random positions.

16. The apparatus of claim 15, wherein the circuitry of the media access control block further selects the random positions.

17. The apparatus of claim 16, wherein said circuitry of the media access control block further determines if another set of random positions needs to be selected.

18. The apparatus of claim 11, wherein the apparatus is a selected one from a group consisting of a computer system, a set-top box, a printer, a scanner, a router, a bridge, a hub, and a switch.

* * * * *